May 29, 1951 F. M. SCHMIDT 2,555,295

TONE PRODUCING AND AMPLIFIER CONTROL FOR ELECTRONIC ORGANS

Filed Jan. 8, 1948 2 Sheets-Sheet 1

INVENTOR.
Francis M. Schmidt
BY
Moore, Olson & Trexler
Attys.

May 29, 1951 F. M. SCHMIDT 2,555,295

TONE PRODUCING AND AMPLIFIER CONTROL FOR ELECTRONIC ORGANS

Filed Jan. 8, 1948 2 Sheets-Sheet 2

INVENTOR.
Francis M. Schmidt
BY
Moore, Olson & Trexler
Attys.

Patented May 29, 1951 2,555,295

UNITED STATES PATENT OFFICE 2,555,295

TONE PRODUCING AND AMPLIFIER CONTROL FOR ELECTRONIC ORGANS

Francis M. Schmidt, North Tonawanda, N. Y., assignor to The Rudolph Wurlitzer Company, North Tonawanda, N. Y., a corporation of Ohio Application January 8, 1948, Serial No. 1,114

15 Claims. (Cl. 84—1.21)

This invention relates to tone producing systems for electronic musical instruments, and specifically electronic organs; and concerns particularly the amplifier circuits of such tone producing systems, and their associated elements.

In the operation of electrical musical instruments, and specifically electronic organs of the type to which the present invention particularly relates, there is provided a plurality of banks of tone generators which are selectively operable to generate tones in the form of electrical waves, the waves being combined and transmitted to a loud speaker or other reproducing apparatus wherein they are transformed and emitted as sound. In such instruments it is desirable that amplifying means be provided, for amplifying and transmitting the pulsations or oscillations produced by the tone generators into sound or electrical pulsations of suitable intensity, and that means be provided for varying such intensity at will and in accordance with operating requirements. It is furthermore desirable, that in the amplification of the pulsations from the tone generators, the quality or wave form thereof in some instances be preserved and in other instances reshaped, as may be required; and that means be provided for accentuating or attenuating the various tone and harmonic component frequencies in respect to each other, either at a fixed volume level, or at variable volume levels throughout the range of the instrument.

It is an object of the present invention to provide an improved tone producing and amplifier circuit for electrical musical instruments, and more specifically to provide an improved tone producing and variable amplifier circuit for an electronic organ of the type defined.

It is a further object of the present invention to provide an improved amplifier structure specifically for electronic organs, wherein the quality or wave shape of the electric oscillations produced from the tone generators is selectively preserved or varied in a controlled and improved manner, so as to provide desired tonal effects.

A still further object of the present invention is to provide, in an amplifier structure for electronic organs of the type defined, an improved circuit control incorporating means for attenuating or accentuating the different frequencies of the various tones produced, at the various tone levels, so as to provide proper tonal effects throughout the instrument volume range.

Another object is to provide an improved amplifier swell control for electronic organs.

Various other objects, advantages, and features of the invention will be apparent from the following specification when taken in connection with the accompanying drawings wherein a preferred embodiment is set forth for purposes of illustration.

In the drawings wherein like reference numerals refer to like parts throughout:

Figure 1:
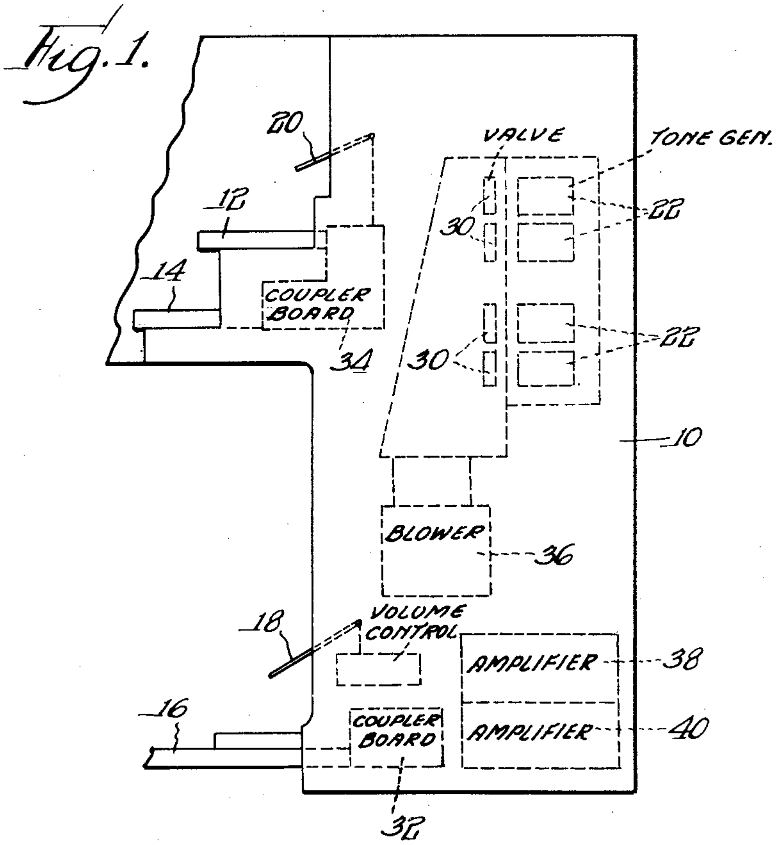
Fig. 1 is a diagrammatic view of an electrical musical instrument, and specifically an electronic organ, incorporating a tone producing and amplifier circuit constructed in accordance with and embodying the principles of the invention.
Figure 2:
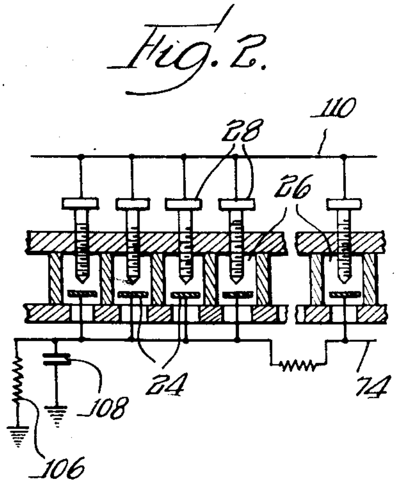
Fig. 2 is a detail view showing a part of the tone generators.

The particular electronic organ illustrated in Fig. 1 comprises a casing or housing 10 arranged to support a swell manual or keyboard 12, a great manual or keyboard 14, and a pedal clavier 16. There is also provided a volume control pedal 18, by means of which the overall volume or level of the instrument may be controlled, and a series of stop tablets 20 by means of which the various tone generators are caused to be activated and the volume thereof controlled, in banks, in the particular instrument shown. Further disposed within the casing 10 is a plurality of banks of tone generators 22 which may, for example, be of the type and kind shown in the patent to Hoschke, 2,015,014. More specifically, and as shown in Fig. 2, these tone generators comprise a series of vibratory reeds 24 individually disposed within cells 26, each reed having associated therewith an adjustable pickup screw 28 forming with its associated reed a capacitor variable in accordance with the reed vibrations.

Air is admitted to the cells 26, so as to cause the selective vibration of the reeds, by means of a series of pallet valves 30, the selective operation of which is controlled conjointly by the keys of the manuals, pedal clavier, and the stops 20. This control is effected by coupler boards as shown at 32 and 34, the coupler boards containing switches selectively actuated by the keys of the manuals and pedal clavier, in accordance with the selected stops which have been depressed, so as to cause the operation of the desired pallet valves to thereby admit actuating air to vibrate the desired reeds.

The air supply for the reeds is provided from a blower 36. The electrical output from the tone generators or reeds is transmitted to an amplifier 38, the details of which form a part of the present invention, and thence to further amplifying means as indicated at 40, and to a series of speakers or tone outlets 42, Fig. 4.

Certain of the stops 20 effect a selection of the tone generators for operation, as previously described, whereas other of the stops are provided for intensity control purposes to selectively control the intensity or level of the individual banks of tone generators. This intensity control, for the individual banks of reeds, is more particularly set forth in my application, Serial Number 1,112, filed of even date herewith, and insofar as such control forms a part of the present invention is diagrammatically illustrated in Fig. 4, the intensity control switches being indicated therein by the reference numerals 44, 46 and 48.

Figure 4:
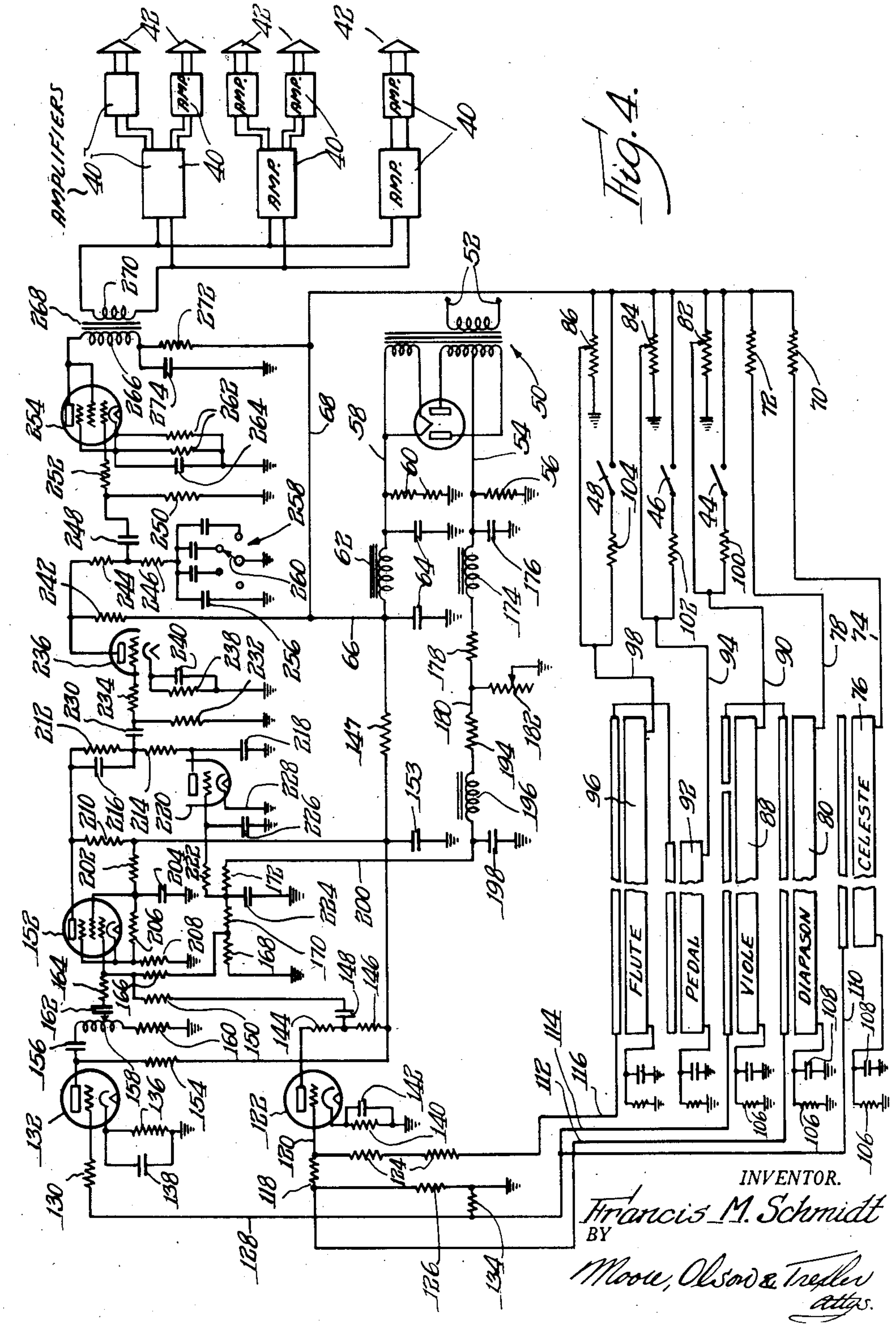
Fig. 4 is an electric circuit diagram illustrating the control structures of the present invention.

Referring to Fig. 4, it will be seen that there is provided a full wave electronic tube rectifier unit, generally indicated by the numeral 50, powered from a suitable source of A. C. supply, as indicated at 52. The negative D. C. return line from the rectifier is indicated at 54, connected to ground through a resistor 56. The positive D. C. output wire 58 from the rectifier is also connected to ground through a stabilizing resistor 60, and connects through a ripple filter comprising an iron core choke 62 and a pair of capacitors 64 to a line 66 which in turn connects with a line 68 leading to the intensity control arrangement, previously mentioned.

More particularly, this intensity control structure comprises a pair of fixed resistors 70 and 72 by means of which the voltage of supply wire 68 is communicated, respectively, and at the desired value, to a wire 74 leading to a bank of celeste reeds 76, and a wire 78 leading to a bank of diapason reeds 80. The unit further comprises a series of three adjustable resistors 82, 84 and 86 for applying selected reduced voltages to the viole reeds 88 by means of a wire 90, to the pedal reeds 92 by means of a wire 94, and to the flute reeds 96 by means of a wire 98. Stop actuated switch 44, when closed, shorts the adjustable resistor 82 and applies a predetermined greater voltage to the viole reeds through a resistor 100. The stop switch 46, when closed, shorts the adjustable resistor 84 and applies a predetermined greater voltage to the pedal reeds determined by the value of the resistor 102. Stop switch 48, when closed, shorts the adjustable resistor 86 and applies a predetermined greater voltage to the flute reeds determined by the value of a resistor 104.

The several banks of reeds are preferably interconnected in the detailed manner illustrated in my co-pending application, Serial Number 1,113, also filed of even date herewith. As diagrammatically illustrated in Figure 4, it will be seen that each reed bank is connected to ground through a resistor 106 and a by-pass condenser as indicated at 108, the reeds being connected in parallel to the resistor and condenser, as best shown in Fig. 2.

As also best shown in Fig. 2, for the celeste reeds, the adjustable tone screws 28 are connected in parallel to a wire such as indicated at 110, which wire, Fig. 4, leads to an amplifier structure presently to be described. Similarly, the diapason tone screws and a portion of the viole tone screws are connected in parallel to a wire as shown at 112; the remaining portion of the viole reeds are connected in parallel to a wire 114, and the pedal and flute tone screws are connected in parallel and in common to a wire 116, all leading to the amplifier structures.

As more particularly pointed out in said Hoschke patent, the vibrations of the reeds, as the reeds are selectively vibrated by the air blasts, produce pulsations in the output wires 110, 112, 114 and 116, leading from the tone screws, due to the variable capacitor action between the vibrating reeds and the tone screws. The capacitors 108 form a part of this signal circuit. The intensity of the pulsations is determined by the intensity of the polarizing voltage applied to the reeds under control of the various resistors 70—72, 82—86, and 100—104, previously described.

The character of the sounds, or more accurately stated, the wave shape of the electrical pulsations produced by the motion of the reeds, is qualitatively controlled to provide the desired and qualitatively different tonal effects from the various banks of reeds, as indicated by the designations applied thereto. These qualitative characteristics result and are imparted in part by the physical components of the tone screw-reed relationships; and in accordance with the present invention are further preserved, modified and controlled in accordance with the tonal characteristics desired, by the treatment accorded the electrical pulsations within the amplifier structure.

More particularly, referring to Fig. 4, it will be seen that line 112 from the diapason reeds, connects through a resistor 118 to line 120 leading to the grid of a class A straight line amplifier triode 122. Similarly, line 116, leading from the tone screws of the flute reeds is connected through a pair of resistors 124 also connected to the line 120 and to the grid of tube 122. Line 112 is connected to ground, in advance of resistor 118, through a resistor as indicated at 126. The values of resistors 118, 124 and 126 are so selected as to impart the desired voltages from the reeds to the tube grid; and further cooperate in their resistor values with the capacitance values of the tone screw-reed capacitors and the associated wiring connections, providing shaping circuits for imparting the desired wave shape or tone quality to the grid of the amplifier tube.

Whereas the output from the flute, pedal, diapason, and a part of the viole reeds is transmitted to a straight line amplifier channel comprising the tube 122, the output from the celeste reeds, and from the remainder of the viole reeds is transmitted by wires 110 and 114 to a common wire 128 which leads through a resistor 130 to the grid of a class A amplifier triode 132 forming a part of an attenuating or phase discriminating wave shaping amplifier circuit; said tube circuit being so constituted by reason of its plate circuit connections presently to be described. Wire 128 is connected to ground through a grid resistor as indicated at 134.

As in the case of the resistors for the tube 122 previously described, resistors 130 and 134 in effect form a voltage divider for predetermining the grid applied voltage from the reeds; and further are so selected that their resistor values combine with the capacitance values of the tone generators and associated circuits to impart a desired shaping to the wave form applied to the tube grid. These resistors furthermore serve as isolation resistors for the high impedance tone generators.

The cathode bias resistor for the tube 132, and the associated by-pas capacitor, are conventionally indicated in Fig. 4 at 136 and 138. Similarly, the cathode bias resistor and by-pass capacitor with the tube 122 are indicated respectively at 140 and 142.

The plate load circuit for the tube 122 includes a pair of resistors 144 and 146 connected to the B+ voltage supply line 58, through a further voltage dropping resistor 147, said resistors forming a voltage divider, the intermediate portion of which is connected through a coupling capacitor 148 and a resistor 150 to the control grid of a pentode amplifier tube, as shown at 152. Resistor 147 also forms with capacitor 153 a further ripple filter for the B+ supply from the rectifier.

The plate of tube 132 is connected to the control grid of amplifier pentode 152 through a load circuit which includes a resistor 154 interconnecting the plate of tube 132 to the B+ supply, and a shaping circuit which includes a coupling capacitor 156, a choke 158, and a resistor 160 leading to ground, an intermediate portion of the choke being connected by means of a capacitor 162 and a resistor 164 to the control grid of the pentode amplifier. The resistance, capacitance, and inductance values of the foregoing elements are proportioned to provide a shaping circuit of predetermined resonance characteristics for the output signal from the amplifier tube 132 so as to attenuate the signal tones and the harmonic components thereof in accordance with their frequency, whereby to effect a selective shaping of the tones or signals emanating from the reeds interconnected with tube 132, as compared with those connected to and amplified by the amplifier 122.

The control grid of amplifier tube 152 is connected to ground through an isolation and grid load resistor 166 and a resistor 168, which latter resistor together with the resistors 170 and 172 forms a voltage divider for determining the applied grid voltage of the amplifier pentode.

More particularly, and as further shown in Fig. 4, these elements form a part of the swell or volume control circuit for the amplifier. It will be seen that the negative line 54 of the rectifier is normally maintained at a predetermined value below ground potential through the action of resistor 56. Wire 54 is connected through a ripple filter composed of a choke 174 and a capacitor 176, and through a current limiting resistor 178 to a wire 180, which latter wire is connected to ground through a variable resistor 182 adapted for operation by the swell or volume control pedal 16 of the instrument, as previously described.

Figure 3:
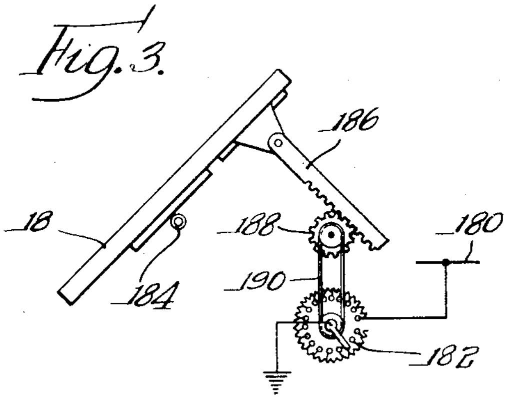
Fig. 3 is a detail view of the volume or swell pedal.

As shown for example in Fig. 3, the swell or volume control pedal may be suitably pivotally mounted, as indicated at 184, and arranged upon pivotal operation to reciprocate a rack 186 in geared engagement with a pinion 188. This latter pinion is arranged by means of a suitable belt and pulley structure 190 to actuate a rotary tap resistor 182, the rotary arm of which is connected to ground and the resistor coil of which is connected at one end to the wire 180. It will be seen that as the pedal is actuated the resistor will be progressively short circuited whereby to vary the voltage level of the wire 180 from ground, when the resistor is completely short circuited, progressively to its maximum negative bias at which it is normally maintained by reason of the action of resistor 56.

Line 180 is connected through a further filter unit comprising an isolating resistor 194, a choke 196 and a capacitor 198 to a wire 200 connected to the voltage divider 168—172, previously described. As the variable resistor 182 is varied, the voltage applied to the control grid of the amplifier pentode 152 will be correspondingly adjusted, whereby to vary the amplifier gain and control the volume level of the instrument.

The screen grid connections for tube 152 include a screen dropping resistor 202 and a screen by-pass condenser 204. The cathode and suppressor grid connections include a pair of voltage dividing resistors 206 and 208, the intermediate point of which is connected in common to the tube cathode and suppressor grid connections. It will be noted that the resistor 208 is not by-passed which speeds up the response of the amplifier tube and also provides a predetermined measure of degeneration.

The plate circuit for the amplifier pentode includes a plate load resistor 210 connected to the B+ supply, and a further shaping circuit comprised of a pair of series connected resistors 212 and 214, a condenser 216 in by-pass relation to the resistor 212, a condenser 218 in series connection with the resistor 214, and a variable resistor triode 220, the function of which will now be described.

More particularly, it will be seen that the grid of the variable resistor tube is connected by means of a grid load resistor 222 to the voltage control line 200 for the control grid of the main amplifier pentode. This connection is made between the resistors 170 and 172, in a particular embodiment shown, and the circuit further includes a pair of filter capacitors 224 and 226.

It will be seen that as the voltage level of line 200 is varied, as previously described, to vary the gain of the pentode amplifier tube 152, the applied current voltage of the variable resistor tube 220 will be correspondingly adjusted, whereby to vary the resistance of the plate circuit afforded through the tube 220, this tube being connected to ground through line 228 as shown.

It will thus be seen that as the gain of the amplifier 152 is varied, the resistance value of the shaping circuit comprised of the elements 212—220 is correspondingly changed as the resistance value of tube 220 is adjusted, whereby a progressively different shaping circuit is produced at each volume level. By this means a different frequency attenuation or frequency discrimination is obtained in the amplifier circuit, at each volume level, to produce desired tone qualities throughout the volume level range.

The plate load circuit for the amplifier 152 further includes a coupling capacitor 230, a grid load resistor 232, and a series-connected current limiting resistor 234 leading to the grid of an amplifier triode 236 which may conveniently be arranged within a common envelope with the variable resistor tube 220. The cathode bias connections for the amplifier triode 236 are conventionally indicated at 238 and 240, respectively.

The load plate circuit for the amplifier tube 236 includes a load resistor 242, connected to the B+ supply, and a pair of series-connected resistors 244 and 246, the intermediate portion of which is connected by means of a coupling capacitor 248, a grid load resistor 250, and a series-connected current limiting resistor 252 with the control grid of a power amplifier tube 254.

It will be seen that the resistor 246 is connected to ground through a fixed capacitor 256 and a variable capacitor 258 formed of three capacitor elements, any one of which may be selectively connected to ground through the action of an adjustable tap switch connection 260. The fixed capacitor 256, the adjustable capacitor 258, and the associated resistors 244 and 246 comprise a further shaping or frequency discriminating circuit for the tone signals, the capacitance values and resultingly the effective operation of which may be selectively controlled by adjustment of the tap switch 260. The adjustable capacitor structure 258 is designed for cooperation with the volume pedal control 182, previously described, and may be aptly termed a pedal compensator. In operation, the adjustable capacitor 258 is provided primarily for compensation of lower frequencies, and therefore also may be termed a bass compensator structure. The adjustable tap switch 260 may be manually preset to adapt the instrument to the acoustics of the location within which the instrument is to be played.

The power amplifier 254 is preferably a beam power tube connected for operation as a triode, the suppressor grid and cathode being connected in common to a pair of cathode bias resistors 262 and a by-pass capacitor 264, as shown. The screen grid and plate are connected in common to the primary coil 266 of a load transformer 268, the secondary coil 270 of which is arranged for connection to the further amplifier and speaker structures 40 and 42, previously described. These connections are diagrammatically indicated herein and are more fully set forth in my co-pending application Serial Number 1,115, of even date herewith.

The load circuit for power tube 254 further includes a plate voltage dropping resistor 272 by means of which the plate circuit is interconnected with the B+ supply, and a by-pass capacitor as indicated at 274 for the signal circuit.

It will be seen that the tone producing and amplifier circuit herein set forth provides a plurality of series of tone generators, the volume of which may be selectively controlled by controlling the polarizing voltage applied thereto. The qualitative output from the tone generators, provided by the physical relationships thereof, is preserved or modified in accordance with desired requirements by the selective shaping treatment accorded within the amplifier structures. An improved and simplified gain control is provided for the amplifier, and means is provided automatically operable therewith for varying the frequency discriminating or wave shaping characteristics of the signal circuit as the sound level of the amplifier is varied, this action being effected through the variable resistor tube 220. Means is further provided, by the pedal or bass compensator 258, for facilitating the selective adjustment of the frequency discriminating characteristics of the circuit, in accordance with the acoustics of the location within which the instrument is to be played.

It is obvious that various changes may be made in the particular electronic musical instrument, and in the specific embodiment thereof set forth for purposes of illustration, without departing from the spirit of the invention. The invention is accordingly not to be limited to the specific structures shown and described, but only as limited by the following claims.

The invention is hereby claimed as follows:

1. An electronic musical instrument having a sound producing system comprising a plurality of sets of tone generators of different quality, a tone outlet, and means interposed between said tone generators and outlet including a plurality of amplifier channels individually connected to said sets of tone generators said amplifier channels including linear amplifying means and frequency discriminating amplifying means of predetermined different value, connected substantially in parallel therewith.

2. An electronic musical instrument having a sound producing system comprising a plurality of sets of tone generators of different quality, a tone outlet, means interposed between said tone generators and outlet including a plurality of amplifier channels individually connected to said sets of tone generators, one of said channels providing straight line amplification, and another of said channels forming a frequency discriminating amplifier circuit, means connecting some of said tone generators to said first mentioned channel means connecting some of said tone generators to said second mentioned channel, and of said tone generators some means connecting to both of said channels.

3. An electronic musical instrument having a sound producing system comprising a plurality of sets of tone generators of different quality, a tone outlet, and means interposed between said tone generators and outlet including a plurality of amplifier channels individually connected to said sets of tone generators, at least one of said amplifier channels including frequency discriminating means of predetermined different value and at least one of said channels being substantially linear, a combining amplifier channel fed by said plurality of amplifier channels, adjustable frequency discriminating means in said combining amplifier channel, and means for controlling the gain of said combining amplifier channel.

4. An electronic musical instrument having a sound producing system comprising a plurality of sets of tone generators of different quality, a tone outlet, and means interconnecting said tone generators and outlet including a plurality of amplifier channels individually connected to said sets of tone generators, said amplifier channels including frequency discriminating means of predetermined different value, a combining amplifier channel fed by said plurality of amplifier channels, means for controlling the gain of the combining amplifier channel, and frequency discriminating means connected to said combining amplifier channel and to said gain control means thereby being adjustable in accordance with the operation of the gain control means.

5. An electronic musical instrument having a sound producing system comprising a plurality of sets of tone generators of different quality, a tone outlet, and means interposed between said tone generators and outlet including a plurality of amplifier channels individually connected to said sets of tone generators, said amplifier channels including frequency discriminating means of predetermined different value, a combining amplifier channel fed by said plurality of amplifier channels, means for controlling the gain of the combining amplifier channel, and manually adjustable frequency discriminating means connected to said combining amplifier channel for controlling the operation thereof.

6. An electronic musical instrument having a sound producing system comprising a plurality of sets of tone generators of different quality, a tone outlet, and means interconnecting said tone generators and outlet including a plurality of amplifier channels individually connected to said sets of tone generators, said amplifier channels including frequency discriminating means of predetermined different value, a combining amplifier channel fed by said plurality of amplifier channels, means for controlling the gain of the combining amplifier channel, and a plurality of frequency discriminating means connected to the combining amplifier channel, one of said frequency discriminating means being manually adjustable, and the other of said frequency discriminating means being responsive to the operation of said gain control means.

7. An electronic musical instrument having a sound producing system comprising a plurality of sets of tone generators of different quality, a tone outlet, and means interposed between said tone generators and outlet including a plurality of amplifier tubes individually connected to said sets of tone generators, a plurality of load circuits of predetermined different reactance individually provided for said tubes, an amplifier tube connected in common to said load circuits, means including a manually adjustable control member for controlling the gain of said last mentioned tube, and variable frequency discriminating means connected to the output circuit of said tube.

8. An electronic musical instrument having a sound producing system comprising a plurality of sets of tone generators of different quality, a tone outlet, and means interposed between said tone generators and outlet including a common amplifier tube having a cathode, control grid, and plate circuit, a manually operable control member for adjusting the relative potential of the grid and cathode, to thereby control the gain of said tube, and a plurality of variable frequency discriminating means connected to the output circuit of said tube, at least one of said frequency discriminating means being manually presettable.

9. An electronic musical instrument having a sound producing system comprising a plurality of sets of tone generators of different quality, a tone outlet, and means interposed between said tone generators and outlet including a common amplifier tube having a cathode, control grid, and plate circuit, a manually operable control means for adjusting the grid potential of said tube to thereby adjust the tube gain, and a plurality of variable frequency discriminating means connected to the output circuit of said tube, at least one of said frequency means being manually presettable.

10. An electronic musical instrument having a sound producing system comprising a plurality of sets of tone generators of different quality, a tone outlet, and means interconnecting said tone generators and outlet, including an amplifier tube including a cathode, control grid, and plate circuit, and manually operable control means for adjusting the grid potential of said tube to thereby adjust the tube gain, said control means including a foot pedal and an adjustable resistor operated thereby, said resistor being operable when completely short circuited to connect said grid to ground potential.

11. An electronic musical instrument having a sound producing system comprising a plurality of sets of tone generators of different quality, a tone outlet, and means interconnecting said tone generators and outlet including an amplifier, means for adjusting the gain of the amplifier, and frequency discriminating means connected to the amplifier, said frequency discriminating means being operable in response to the gain adjusting means.

12. An electronic musical instrument as defined in claim 11, wherein said frequency discriminating means comprises a variable resistor tube, the plate circuit resistance of which is controlled by said gain adjusting means.

13. An electronic musical instrument having a sound producing system comprising a plurality of sets of tone generators of different quality, a tone outlet, and means interconnecting said tone generators and outlet including an amplifier, means for controlling the gain of the amplifier, and a plurality of frequency discriminating means connected to the amplifier, one of said frequency discriminating means being operated in response to the gain control means, and means for manually adjusting the other of said frequency discriminating means.

14. An electronic musical instrument having a sound producing system comprising a plurality of sets of tone generators of different quality, a tone outlet, and means interconnecting said tone generators and outlet including a common amplifier, means for controlling the gain of the amplifier, a plurality of frequency discriminating means connected to the amplifier, means for manually presetting at least one of the frequency discriminating means, and means for operating all of said frequency discriminating means in response to the gain controlling means.

15. An electronic musical instrument having a sound producing system comprising a plurality of sets of tone generators of different quality, a tone outlet, and means interconnecting said tone generators and outlet including an amplifier, means for controlling the gain of the amplifier, and frequency discriminating means connected to the amplifier, said frequency discriminating means comprising a plurality of reactance elements of predetermined different value, and a tap switch for selectively connecting one or more of said elements for operation, and means connecting said tap switch to the gain controlling means for operation therewith.

FRANCIS M. SCHMIDT.

REFERENCES CITED

The following references are of record in the file of this patent:

UNITED STATES PATENTS

| Number | Name | Date |
|---|---|---|
| 2,015,014 | Hoschke | Sept. 17, 1935 |
| 2,237,105 | Miessner | Apr. 1, 1941 |
| 2,310,429 | Hanert | Feb. 9, 1943 |
| 2,328,282 | Kock | Aug. 31, 1943 |
| 2,429,226 | Hanert | Oct. 21, 1947 |